United States Patent [19]
Ishido et al.

[11] 4,449,713
[45] May 22, 1984

[54] AQUEOUSLY-SWELLING WATER STOPPER AND A PROCESS OF STOPPING WATER THEREBY

[75] Inventors: Yoshinobu Ishido; Hideo Tanaka, both of Fukuyama, Japan

[73] Assignee: Hayakawa Rubber Company Limited, Fukuyama, Japan

[21] Appl. No.: 369,624

[22] Filed: Apr. 19, 1982

Related U.S. Application Data

[62] Division of Ser. No. 226,896, Jan. 21, 1981, Pat. No. 4,366,224.

[30] Foreign Application Priority Data

Oct. 17, 1980 [JP] Japan ................................ 55-145358
Oct. 17, 1980 [JP] Japan ................................ 55-145359

[51] Int. Cl.³ ............................................. E02D 29/16
[52] U.S. Cl. .......................................... 277/1; 227/227
[58] Field of Search ................. 524/447, 515; 52/396, 52/247; 404/64–70; 277/1, 207, 3, 27, 9.5, 227

[56] References Cited

U.S. PATENT DOCUMENTS

| 1,206,306 | 11/1916 | Crane | 277/228 |
| 2,849,070 | 8/1958 | Maly | 277/9.5 |
| 4,174,993 | 11/1979 | Fujii | 524/515 |
| 4,366,284 | 12/1982 | Ishido et al. | 524/447 |

FOREIGN PATENT DOCUMENTS 600077 12/1977 Switzerland ........................ 52/396

Primary Examiner—Robert I. Smith
Attorney, Agent, or Firm—Parkhurst & Oliff

[57] ABSTRACT

The disclosed water stopper and water stopping process use an aqueously-swelling water-stopping composition consisting of 10 to 40 weight % of rubber whose main ingredient is reclaimed rubber, 10 to 20 weight % of silicic compound, 10 to 60 weight % of bentonite, and 10 to 40 weight % of plasticizer. The aforesaid water-stopping composition may be extruded into an elongated water stopper with or without a core therein, which water stopper can be inserted into a joint gap or other gap of structural members to stop water at the gap.

4 Claims, 30 Drawing Figures

AQUEOUSLY-SWELLING WATER STOPPER AND A PROCESS OF STOPPING WATER THEREBY

This is a division of application Ser. No. 226,896 filed Jan. 21, 1981 now U.S. Pat. No. 4,366,224.

BACKGROUND OF THE INVENTION

1. Field of the Invention

This invention relates to a novel aqueously-swelling water stopper to be placed in a joint gap of structural members to fully fill up and close the joint gap for stopping water there. The invention also relates to a process of stopping water by using such water stopper.

More particularly, the invention relates to a water stopper having an outer resilient rubber layer made of aqueously-swelling water-stopping composition with a core having a high tensile strength, which rubber layer absorbs water and swells upon absorbing water to expand the volume thereof, and the invention also relates to a process of stopping water in architectural, civil engineering or other public structure (to be referred to as "building structure", hereinafter) by filling the aforementioned water stopper in a juncture gap or other gap of concrete or metallic structural member of the building structure, so that when water flows into the gap, the rubber layer swells to fully prevent water from seeping in or leaking out relative to the gap of the building structure.

2. Description of the Prior Art

In constructing various building structures, numerous water stoppers have been used, which are made of rubber, plastics, asphalt and the like. Such water stoppers of the prior art have shortcomings in that most of them have good adhesiveness but they are too soft and sometimes sticky, and that their properties vary with temperature variation, for instance, they become too hard in winter to be used in the field. Besides, after being used for a long period of time, the water stoppers of the prior art tends to reduce their resiliency or to become subject to creep phenomenon, so that the water stopper becomes less adaptable to fluctuation of structural gaps and fails to maintain full water stopping ability thereof.

It has been proposed recently to provide an aqueously-swelling water-stopping composition by adding aqueously-swelling organic substances to non-cross-linked rubber type water stoppers to improve the water-stopping ability thereof. The proposed water-stopping composition has difficulties in that, when the compounding ratio of the aqueously-swelling organic substance is low, sufficient water-stopping ability cannot be achieved, while if the compounding ratio thereof is too high, the dispersion of the aqueously-swelling organic substance in the rubber matrix becomes insufficient and the strength of the composition is considerably reduced. Besides, the aqueously-swelling organic substance is subject to hydrolysis, deterioration by oxidation, and decomposition, and its swelling ability tends to be weakened as the swelling and drying are repeated, and the residual low molecular weight components tend to cause poisonous effects.

Various new water stoppers are recently used at joints of concrete preformed members in the field of civil engineering constructions, such as junctions of box culvert segments and concrete flumes. Such new water stoppers are, for instance, those made of soft resilient asphalt, those having semi-hard plastics cores enclosed by soft adhesive mainly consisting of atactic polypropylene, those made of foam rubber or foamed plastics, or the foregoing water stoppers provided with adhesive layers disposed on all or a part of the outer surfaces thereof.

It is noted that joint portions of preformed concrete members are often made in socket-and-plug type or male-female type. Such joint portions sometimes cause water leakage, because of insufficient dimensional accuracy in spite of substantial overall uniformity of dimensions, improper field work at the construction site, or uneven sinking of the land.

The aforesaid water stoppers mainly consisting of resilient soft asphalt or atactic polypropylene have such a temperature sensitivity that, in winter they become too hard and their workability is reduced, while in summer they become too soft and sticky so that their workability is reduced in summer too. The foam structure and compressibility of the foam rubber or foamed plastics of the aforesaid water stoppers of the prior art are such that the water stoppers cannot fully absorb the dimensional inaccuracy and unevenness of the concrete surfaces. Such insufficient workabilities and properties of materials have been causes of water leakage in the prior art.

SUMMARY OF THE INVENTION

Therefore, an object of the present invention is to obviate the aforesaid shortcoming and difficulties of the prior art, by providing a novel water stopper and a novel process of stopping water wherein dimensional inaccuracy and difference of field conditions at construction sites are overcome the aqueously-swelling function of the water stopper, so as to prevent water leakage.

To fulfill the aforesaid object, the invention provides an aqueously-swelling water-stopping composition consisting of 10 to 20 weight % of silicic compound, 10 to 60 weight % of bentonite, and 10 to 40 weight % of plasticizer. The present invention intends to provide an economical water-stopping composition by using rubber whose main ingredient is comparatively inexpensive reclaimed rubber, instead of expensive non-cross-linked organic virgin rubber, and by replacing a part of comparatively expensive silicic compound with inexpensive bentonite.

A simple form of the water stopper of the present invention comprises an extruded member of the above-mentioned aqueously-swelling water-stopping composition, in the form of bar, string, plate, or the like.

A preferred embodiment of the aqueously-swelling water stopper according to the present invention is characterized in that the water stopper comprises an elongated core member having a high tensile strength, and at least one layer of the abovementioned aqueously-swelling water-stopping composition secured to the outer surface of said core member.

The elongated core member having a high tensile strength can be made of hard rubber, hard plastics, metal, or a combination thereof. The shape of the elongated core member can be of solid bar, hollow bar, string-like form, or planar form. The layer of the aqueously-swelling water-stopping composition can be applied to the elongated core member so as to enclose the core member.

Another object of the present invention is to provide an aqueously-swelling water stopper comprising an elongated core member with a high tensile strength, and at least two covering layers enclosing the core member, an outer layer of said covering layers being made of the abovementioned aqueously-swelling water-stopping composition, at least a part of an outermost layer of said covering layers being made of water-passing resilient substance such as sponge.

Another object of the present invention is to provide an aqueously-swelling water stopper comprising an elongated core member, at least one layer of aqueously-swelling water-stopping composition secured to the outer surface of said core member, and an adhesive layer secured to at least a part of the outer surface of the outermost layer consisting of the abovementioned aqueously-swelling water-stopping composition.

A further object of the present invention is to provide a process of stopping water at a gap in a building structure, comprising the steps of forming a water stopper by securing at least one layer of aqueously-swelling water-stopping composition on an outer peripheral surface of an elongated core member having a high tensile strength; and placing the water stopper in the gap of the building structure, whereby the water stopper swells by absorbing water from the inside or outside of the structure so as to fill up that portion of the gap where said water stopper is placed. The water stopper may include a plurality of soft rubber layers enclosing the core member, and the aforesaid aqueously-swelling water-stopping composition layer may be the outermost layer of said plurality of layers.

Another object of the present invention is to provide a process of stopping water at a gap in a building structure, comprising the steps of forming a water stopper by enclosing an elongated core member having a high tensile strength within at least one layer of aqueously-swelling water-stopping composition and an outermost layer having at least a part thereof made of water-passing resilient substance; and placing the water stopper in the gap of the building structure, whereby the water stopper swells by absorbing water from the inside or outside of the structure so as to fill up that portion of the gap where the water stopper is placed.

A still further object of the present invention is to priovide a process of stopping water at a gap in a building structure, comprising the steps of forming a water stopper by enclosing an elongated core member having a high tensile strength within at least one layer of aqueously-swelling water-stopping composition and by securing an adhesive layer to at least a part of the outermost layer consisting of the abovementioned composition; and placing the water stopper in the gap of the building structure, whereby the water-stopper swells by absorbing water from the inside or outside of the structure so as to fill up that portion of the gap where the water stopper is placed.

BRIEF DESCRIPTION OF THE DRAWINGS

For a better understanding of the invention, reference is made to the accompanying drawings, in which.

Like parts are designated by like numerals and symbols throughout different views of the drawings.

DESCRIPTION OF THE PREFERRED EMBODIMENTS

Figure 1:
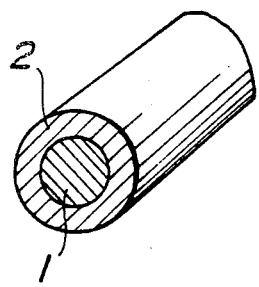
FIGS. 1 through 6 are schematic perspective views of water stoppers of the invention, which are formed by enclosing solid core members within aqueously-swelling water-stopping compostions.

The aqueously-swelling water-stopping composition according to the present invention will be described at first, by referring to the nature, composition, production, and examples thereof.

The composition of the present invention uses three kinds of indispensable components; i.e., component (A) consisting of reclaimed rubber or a mixture of reclaimed rubber as main ingredient and a suitable amount of non-cross-linked virgin rubber, components (B) consisting of silicic compound and bentonite, and component (C) consisting of plasticizer.

As regards the component (A), the reclaimed rubber is reclaimed butyl rubber, reclaimed tire rubber, or the like; and the non-cross-linked virgin rubber is, for instance, natural rubber, styrene-butadiene copolymer rubber, ethylene-propylene-diene terpolymer rubber, isoprene rubber, acrylonitrile-butadiene copolymer rubber, acrylic rubber, ethylene-propylene rubber, chloroprene rubber, butyl rubber, or butyl halide rubber. Among the aforesaid non-cross-linked rubbers, the preferable rubbers are butyl rubber, butyl halide rubber, polyisobutylene, ethylene-propylene-diene terpolymer rubber, and partly-cross-linked butyl rubber. Any of the aforesaid rubbers may be used alone, or an arbitrary mixture of any two or more of them may be used in the present invention.

As regards the components (B), the silicic compound (white carbon) to be used is silicic acid anhydride (dry white carbon), hydrous silicic acid (wet white carbon), or silicate white carbon. Any of the aforesaid silicic compounds (white carbons) can be used alone or a mixture of two or more compounds thereof can be used in the present invention.

Bentonite has a main ingredient of montmorillonite and contains quartz, feldspar, and calcite. The major components of bentonite are silicon dioxide ($SiO_2$) and aluminum oxide ($Al_2O_3$). Bentonite is characterized by its properties of absorbing water and swelling to a great extent.

As regards the plasticizer for the component (C), it is necessary to make selection to a certain extent depending on the type of rubber being used, but in general, it is possible to use mineral oil softeners, vegetable oil softeners, fatty acid, fat and oil, esters, phosphates, paraffinic derivatives, and the like. Examples of the plasticizer are paraffinic mineral oils, naphthenic mineral oils, aromatic mineral oils, stearic acid, palmitic acid, castor oil, cotton seed oil, rapeseed oil, paraffin, paraffin chloride, dioctyl phthalate, dioctyl adipate, dibutyl subacate, tricresyl phosphate, liquid chloroprene, liquid polyisobutylene, liquid polybutadiene, liquid polybutene, and the like.

The aqueously-swelling water-stopping composition of the present invention is made of the aforesaid ingredients, and the compounding ratio of the ingredients is somewhat modifiable so as to meet the requirements of each application. Preferably, the weight percents of the ingredients in the composition of the invention in terms of (rubber):(silicic compound filler):(bentonite filler):(plasticizer) are in a range of (10–40):(10–20):(10–60):(10–40).

The rubber used in a preferred embodiment is the aforesaid reclaimed rubber alone or a mixture of the reclaimed rubber and 10 to 30 weight % of non-cross-linked virgin rubber.

In the aforementioned compounding ratios, if the quantity of the silicic compound filler is less than 10 weight %, the degree of swelling by water absorption (to be referred to as "aqueous swelling", hereinafter) is small and sufficient water-stopping effect cannot be achieved. On the other hand, if the quantity of the silicic compound filler exceeds 20 weight %, the shaping of the composition becomes difficult and the resultant composition becomes unduly brittle.

If the quantity of the bentonite filler is less than 10 weight %, the degree of aqueous swelling of the composition becomes too small to achieve the desired water-stopping effect, while the bentonite filler in excess of 60 weight % is not desirable because the composition becomes too fragile after the aqueous swelling.

The kind and amount of the plasticizer can be adjusted so as to produce proper hardness of the composition which meets specific needs of each application. It is not desirable to make the composition of rubber too hard, because the too hard composition of rubber results in a small degree of aqueous swelling, causes difficulty in achieving the flatness of overlapped joint portions, and necessitates a large force for tightening. An excessive amount of the plasticizer is not desirable, because it tends to cause a low shaping workability, low processing workability due to the high deformability thereof, and low resistance against water pressure.

In addition to the aforementioned indispensable ingredients, it is possible to use conventional ingredients, such as inorganic fillers, age resistors, tackifiers, lubricants, and the like.

As regards the mixer to mix the ingredients, a regular rubber mixer such as a mixing mill, a kneader, and a Banbury mixer can be used. A suitable shaping machine is an extruder or a calender roller. The shaping of the composition of the invention can be carried out in a manner similar to that of the conventional water stopper made of rubber.

The preferable degree of swelling of the aforesaid composition of the invention is 25% or more. The degree of swelling is determined by the following formula.

$$\text{Degree of swelling (\%)} = \frac{W_{24} - W_0}{W_0} \times 100$$

here, $W_0$ is the weight under dry condition, and
$W_{24}$ is the weight after being dipped in the water of a public water supply for 24 hours.

As described above, the composition of the invention consists of the three kinds of indispensable components; namely, the component (A) whose main ingredient is reclaimed rubber, the components (B) of silicic component supplemented with a large amount of bentonite, and the component (C) of plasticizer, and the water-absorbing substance is well dispersed in the rubber matrix. The strength of the composition should not deteriorate, even after long years of use. The degree of swelling of the aqueously-swelling water-stopping composition of the invention is not reduced even after repeated swelling and drying, and the degree of swelling thereof is not affected by the presence of hard water. The ingredients of the composition of the invention are free from deterioration and rotting, so that the composition is highly durable. Furthermore, the composition of the invention does not contain any water-soluble ingredients, so that there is no risk of causing any poisonous effects.

The composition of the invention will now be described in further detail by referring to Examples, wherein parts of quantity refer to parts by weight. It should be understood that the present invention is not restricted to the Examples.

As regards the starting materials used in the Examples, rubbers, silicic compounds, bentonite, and plasticizer were those on the market. As to the reclaimed rubbers, the reclaimed tire rubber was that on the market, and the reclaimed butyl rubber was treated and prepared in the following manner. Used butyl rubber tubes were pulverized, and the pulverized small particles were agitated and mixed with petroleum mineral oil, placed in an autoclave, heated by directly applying steam thereto, and desulfurized. The desulfurized rubber was kneaded several times by a mixing mill and then re-plasticized to obtain the desired reclaimed butyl rubber.

EXAMPLE 1

An aqueously-swelling water-stopping composition consisting of the following ingredients was kneaded by a mixing mill;

| | |
|---|---|
| Reclaimed butyl rubber | 25 parts |
| Polyisobutylene | 5 parts |
| (Vistanex L-100, made by Esso Co., U.S.A.) | |
| Hydrous silicic acid | 18 parts |
| (Nipsi VN-3, made by | |
| Nippon Silica Co., Ltd., Japan) | |
| Bentonite | 30 parts |
| (Kunigel, made by | |
| Kunimine Kogyo Co., Ltd., Japan) | |
| Polybutene | 5 parts |
| (HV-300, made by | |
| Nisseki Jushikagaku Co., Ltd., Japan) | |
| Naphthenic mineral oil | 17 parts |
| (Diana Process Oil KL-1, made by | |
| Idemitsu Kosan Co., Ltd., Japan) | |

The kneaded composition was extruded into a strap water stopper with a cross section of 4 mm by 20 mm, by using an extruder.

The degree of aqueous swelling of the strap water stopper thus extruded was 80.6%.

The water stopper was placed in a flange gap of a test vessel, which flange gap was adjusted at 5 mm. When water was poured in the test vessel, the water leaked in the beginning, because the 4 mm thick water stopper did not fill up the 5 mm flange gap. Despite the water leakage, water was continuously poured into the test vessel, and in 2 hours, the amount of water leakage through the flange gap began to be reduced, and after 3 hours, the water leakage was stopped and the water stopper withstood a water pressure of 3 kg/cm$^2$.

EXAMPLE 2

An aqueously-swelling water-stopping composition consisting of the following ingredients was kneaded by a mixing mill.

| | |
|---|---|
| Reclaimed butyl rubber | 10 parts |
| Polyisobutylene | 20 parts |
| Hydrous silicic acid | 15 parts |
| Bentonite | 35 parts |
| Polybutene | 5 parts |
| Naphthenic mineral oil | 15 parts |

The kneaded composition was extruded into a strap with a cross section of 4 mm by 20 mm, by using an extruder. The degree of aqueous swelling of the water-stopping composition was 114.5%.

EXAMPLE 3

An aqueously-swelling water-stopping composition having the following ingredients was kneaded by a mixing mill.

| | |
|---|---|
| Reclaimed tire rubber | 15 parts |
| Polyisobutylene | 10 parts |
| Butyl rubber (Polyisoprene-isobutylene rubber No. 268, made by Nippon Butyl Co., Ltd., Japan) | 10 parts |
| Hydrous silicic acid | 15 parts |
| Bentonite | 40 parts |
| Polybutene | 10 parts |

The kneaded composition was extruded into a strap water stopper by using an extruder. The degree of aqueous swelling of the water-stopping composition was 82.7%.

EXAMPLE 4

An aqueously-swelling water-stopping composition having the following ingredients was kneaded by a mixing mill.

| | |
|---|---|
| Reclaimed tire rubber | 20 parts |
| Polyisobutylene | 10 parts |
| Hydrous silicic acid | 10 parts |
| Bentonite | 40 parts |
| Polybutene | 10 parts |
| Paraffinic mineral oil (Diana Process Oil MM-45, made by Idemitsu Kosan Co., Ltd., Japan) | 10 parts |

The kneaded composition was extruded into a strap water stopper by using an extruder. The dgree of aqueous swelling of the water-stopping composition was 92.3%.

EXAMPLE 5

An aqueously-swelling water-stopping composition consisting of the following ingredients was kneaded by a mixing mill.

| | |
|---|---|
| Reclaimed butyl rubber | 20 parts |
| Butyl rubber | 10 parts |
| Hydrous silicic acid | 10 parts |
| Bentonite | 45 parts |
| Naphthenic mineral oil | 10 parts |
| Paraffinic mineral oil | 5 parts |

The kneaded composition was extruded into a strap water stopper by using an extruder. The degree of aqueous swelling of the water-stopping composition was 105.8%.

EXAMPLE 6

An aqueously-swelling water-stopping composition consisting of the following ingredients was kneaded by a mixing mill.

| | |
|---|---|
| Reclaimed butyl rubber | 15 parts |
| Polyisobutylene | 5 parts |
| Styrene-butadiene copolymer rubber (SBR No. 1507, made by Nippon Goseigomu Co., Ltd., Japan) | 10 parts |
| Hydrous silicic acid | 20 parts |
| Bentonite | 30 parts |
| Polybutene | 5 parts |
| Aromatic mineral oil (Diana Process Oil AH-10, made by Idemitsu Kosan Co., Ltd., Japan) | 15 parts |

The kneaded composition was extruded into a strap water stopper by using an extruder. The degree of aqueous swelling of the water-stopping composition was 100.2%.

EXAMPLE 7

An aqueously-swelling water-stopping composition consisting of the following ingredients was kneaded by a mixing mill.

| | |
|---|---|
| Reclaimed butyl rubber | 15 parts |
| Polyisobutylene | 20 parts |
| Hydrous silicic acid | 5 parts |
| Bentonite | 50 parts |
| Naphthenic mineral oil | 10 parts |

The kneaded composition was extruded into a strap water stopper by using an extruder. The degree of aqueous swelling of the water-stopping composition was 132%.

EXAMPLE 8

An aqueously-swelling water-stopping composition consisting of the following ingredients was kneaded by a mixing mill.

| | |
|---|---|
| Reclaimed butyl rubber | 20 parts |
| Polyisobutylene | 5 parts |
| Natural rubber (RSS No. 3) | 10 parts |
| Calcium silicate (Starlex L, made by Kamishima Kagaku Co., Ltd., Japan) | 10 parts |
| Bentonite | 40 parts |
| Polybutene | 5 parts |
| Naphthenic mineral oil | 10 parts |

The kneaded composition was extruded into a strap water stopper by using an extruder. The degree of aqueous swelling of the water-stopping composition was 95%.

EXAMPLE 9

An aqueously-swelling water-stopping composition consisting of the following ingredients was kneaded by a mixing mill.

| | |
|---|---|
| Reclaimed butyl rubber | 10 parts |
| Polyisobutylene | 10 parts |
| Ethylene-propylene-diene terpolymer (EPT No. 1045, made by Mitsui Sekiyukagaku Co., Ltd., Japan) | 10 parts |
| Hydrous silicic acid | 15 parts |
| Bentonite | 30 parts |
| Polybutene | 25 parts |

The kneaded composition was extruded into a strap water stopper by using an extruder. The degree of aqueous swelling of the water-stopping composition was 86.6%.

EXAMPLE 10

An aqueously-swelling water-stopping composition consisting of the following ingredients was kneaded by a mixing mill.

| | |
|---|---|
| Reclaimed butyl rubber | 10 parts |
| Polyisobutylene | 15 parts |
| Acrylonitrile-butadiene copolymer (N-230S, made by Nippon Goseigomu Co., Ltd., Japan) | 10 parts |
| Bentonite | 30 parts |
| Calcium silicate | 15 parts |
| Polybutene | 10 parts |
| Dioctyl phthalate (D.O.P., made by Kyowa Hakko Co., Ltd., Japan) | 10 parts |

The kneaded composition was extruded into a strap water stopper by using an extruder. The degree of aqueous swelling of the water-stopping composition was 92.1%.

REFERENCE 1

A composition consisting of the following ingredients was kneaded by a mixing mill.

| | |
|---|---|
| Reclaimed butyl rubber | 15 parts |
| Polyisobutylene | 15 parts |
| Hydrous silicic acid | 22 parts |
| Bentonite | 18 parts |
| Polybutene | 30 parts |

The kneaded composition was extruded into a strap water stopper with a cross section of 4 mm by 20 mm, by using an extruder. The degree of aqueous swelling of the composition of the strap was 40%.

The strap was placed in a flange gap of a test vessel so as to extend over the entire length of the flange gap, which flange gap was adjusted at 5 mm. When water was poured into the test vessel, the water leaked because the 4 mm thick strap did not fill up the 5 mm flange gap. Despite the leakage, water was continuously poured into the test vessel, and in the case of the composition of this Reference 1, the water leakage was not stopped even after 20 hours of water pouring.

REFERENCE 2

A composition having the following ingredients was kneaded by a mixing mill.

| | |
|---|---|
| Reclaimed butyl rubber | 10 parts |
| Polyisobutylene | 20 parts |
| Hydrous silicic acid | 30 parts |
| Polybutene | 20 parts |
| Naphthenic mineral oil | 20 parts |

The kneaded composition was extruded into a strap with a cross section of 4 mm by 20 mm, by using an extruder. The degree of aqueous swelling of the composition of the strap was 49.2%.

The strap was placed in a flange gap of a test vessel so as to extend over the entire length of the flange gap, which flange gap was adjusted at 5 mm. When water was poured into the test vessel, the water leaked because the 4 mm thick strap did not fill up the 5 mm flange gap. Despite the leakage, water was continuously poured into the test vessel, and in the case of the composition of this Reference 2, the leakage was not stopped after 20 hours of water pouring.

REFERENCE 3

A composition consisting of the following ingredients was kneaded by a mixing mill.

| | |
|---|---|
| Reclaimed butyl rubber | 5 parts |
| Polyisobutylene | 15 parts |
| Hydrous silicic acid | 5 parts |
| Bentonite | 70 parts |
| Naphthenic mineral oil | 5 parts |

The kneaded composition was extruded into a strap with a cross section of 4 mm by 20 mm, by using an extruder. The degree of aqueous swelling of the strap was 180%. Although the composition of this Reference 3 had a high degree of aqueous swelling, the physical properties of the composition were so deteriorated after the aqueous swelling that the composition was found unsuitable for practical use.

The water stopper of the present invention will now be described in further detail by referring to the accompanying drawings.

FIGS. 1 through 6 show water stoppers of the invention, each of which comprises an elongated solid core member with a high tensile strength and a layer of aqueously-swelling water-stopping composition enclosing the core member. In each of the figures, the water stopper comprises an elongated core member 1 and a layer 2 of aqueously-swelling water-stopping composition. The cross section of the water stopper can be of any suitable shape, such as circular, rectangular, square, planar, trapezoidal, or U-shape. The layer 2 must be made by using the aqueously-swelling water-stopping composition of the invention, which has been described in detail in the foregoing by referring to Examples 1 through 10.

The elongated core member 1, which is of string-like shape in the embodiment of FIGS. 1 through 6, has a high tensile strength and can be made of hard rubber, hard plastics, metal, or a combination thereof.

FIGS. 7 through 10 illustrate different embodiments of the water stopper according to the present invention, each of which comprises a hollow core member 1 with an inner hollow portion 3 and a layer 2 of the aqueously-swelling water-stopping composition enclosing the core member 1. The figures show that the shape of the water stopper can be circular, rectangular, trapezoidal, or semi-circular.

Figure 11:
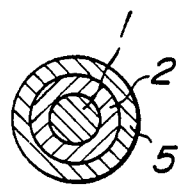
FIGS. 11 through 19 are schematic sectional views of solid or hollow water stoppers of multi-layer construction according to the present invention, which water stoppers have adhesive layers and/or water-passing resilient substance layers provided at a part thereof.

FIGS. 11 through 18 show various embodiments of multi-layer construction of the aqueously-swelling water stopper according to the invention. In the embodiment of FIG. 11, a layer 2 of the aqueously-swelling water-stopping composition surrounds the outer circumference of a solid core member 1, and a water-passing resilient layer 5 such as a sponge rubber layer is applied to the outer surface of the water-stopping composition layer 2. The outermost layer 5 is made water-passing, so that water may seep into the inside thereof and cause the aqueously-swelling water-stopping composition layer 2 to swell.

Figure 12:
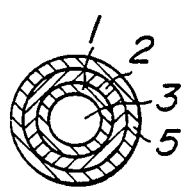

FIG. 12 shows the construction comprising a hollow circular core member 1 with a central hollow portion 3, an aqueously-swelling water-stopping composition layer 2 surrounding the outer surface of the core member 1, and an outermost layer 5 of water-passing resilient substance enclosing the water-stopping layer 2.

Figure 13:
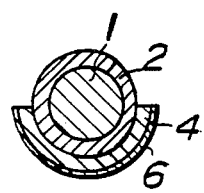

In the embodiment of FIG. 13, an aqueously-swelling water-stopping composition layer 2 surrounds a solid core member 1 with a circular cross section, and an adhesive layer 4 is secured to one half of the outer circumference of the water-stopping composition layer 2. Thus, the adhesive layer 4 covers only one half of the circumference of the aqueously-swelling composition layer 2, so that the adhesive layer 4 never seals the aqueously-swelling composition layer 2 and never interferes with the swelling thereof. A parting paper 6 is provided on the outer surface of the adhesive layer 4.

Figure 14:
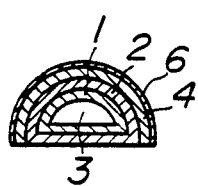

In the construction of FIG. 14, an aqueously-swelling water-stopping composition layer 2 encloses the circumferential surface of a hollow core member 1 with a semi-circular cross section, and an adhesive layer 4 is provided on the semi-circular arcuate outer surface of the water-stopping composition layer 2. A parting paper 6 is attached to the adhesive layer 4.

Figure 15:
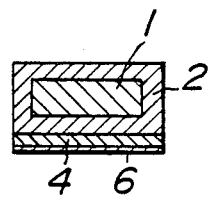
Figure 16:
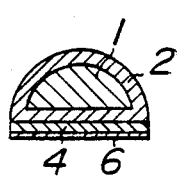

FIGS. 15 and 16 show water stoppers having solid cores members 1 with rectangular and semi-circular cross sections whose entire outer surfaces are covered by aqueously-swelling water-stopping composition layers 2, and an adhesive layer 4 with a parting paper 6 is provided on one planar side surface of each of the water stoppers of the figures.

Figure 17:
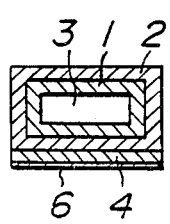

In the construction of FIG. 17, the outer peripheral surface of a hollow rectangular core member 1 is covered by an aqueously-swelling water-stopping composition layer 2, and an adhesive layer 4 with a parting paper 6 is secured to a portion of the outer surface of the water-stopping composition layer 2.

Figure 18:
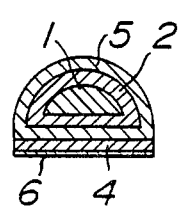

FIG. 18 shows a water stopper having a solid core member 1 with a semi-circular cross section, which core member 1 is enclosed by two layers including an inner layer 2 of the aqueously-swelling water-stopping composition and an outer layer 5 of water-passing sponge-like resilient substance, and an adhesive layer 4 with a parting paper 6 is provided on a part of the outer surface of the outer layer 5.

Figure 19:
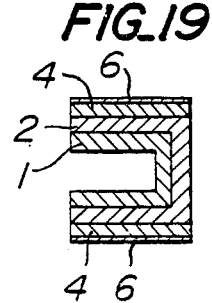

FIG. 19 shows a construction using a U-shaped core member 1 made of hard rubber. An aqueously-swelling water stopping composition layer 2 is secured to the outer surface of the core member 1 while leaving the open end of the U-shaped core member 1 uncovered. Two adhesive layers 4, 4 with parting papers 6, 6 are provided on the opposite outer surfaces of the water-stopping layers 2.

Figure 20:
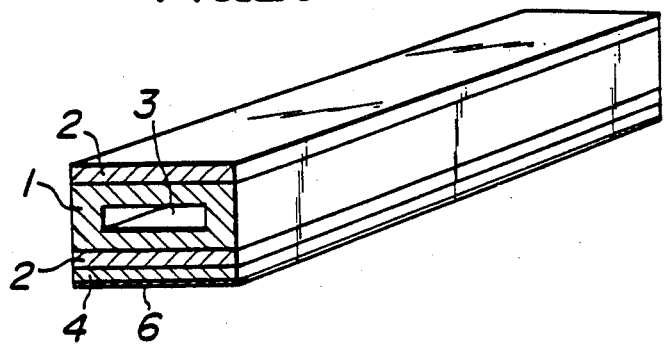
FIG. 20 is a schematic sectional view with an end thereof cutaway, showing a water stopper according to the present invention having a rectangular hollow core member, a pair of water-stopping composition layers secured to opposite surfaces of the core member, and an adhesive layer overlaid on the outside surface of one of said composition layers.

In another embodiment of the water stopper of FIG. 20, a rectangular core member 1 has a hollow portion 3 extending along the longitudinal central axis thereof, which core member is made of foam rubber or the like. A pair of planar layers 2, 2 of the aqueously-swelling water-stopping composition are secured to the opposite surfaces of the core member 1. An adhesive layer 4 having a parting paper 6 is applied to the outside surface of one of the two water-stopping composition layers 2, 2.

The parting paper 6 used in any of the constructions of FIGS. 13 through 20 is to be removed from the adhesive layer 4 just before the use on site, so as to expose the adhesive layer 4 and to facilitate the securing of the water stopper to the surface of concrete or metallic structural member.

FIGS. 21 through 30 show processes of stopping water at junctions of various structural members of building structures, i.e., architectural and civil engineering structures, by using water stoppers of the aqueously-swelling water-stopping composition of the present invention.

Figure 21:
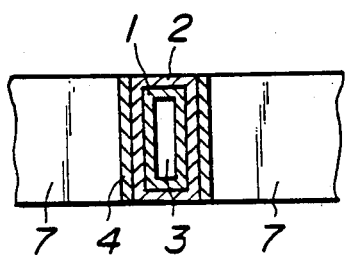
FIGS. 21 through 30 are diagrammatic illustrations of structural joints where the process of stopping water according to the present invention is used.

FIG. 21 shows a flat or abutting joint of concrete boards, wherein the joint is made by abutting one edge of a concrete board 7 to the corresponding edge of another concrete board 7. In this case, if the adhesive layer 4 is provided on at least one surface of the water stopper as shown in FIG. 17, the field work is considerably simplified. More particularly, just before the work at site, the parting paper 6 is peeled off from the adhesive layer 4, and the exposed adhesive layer 4 is attached to the edge surface of the one concrete board 7 so as to integrally secure the water stopper to that concrete board 7, whereby the work of abutting the other concrete board 7 to the water stopper can be carried out easily and safely.

In this case, if the adhesive layers 4 are provided on opposite surfaces of the aqueously-swelling water-stopping composition layer 2 of the water stopper, the field work can be further simplified.

Figure 2:
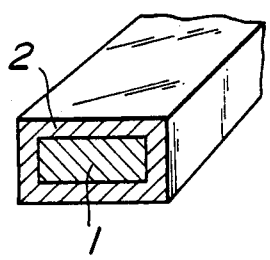
Figure 3:
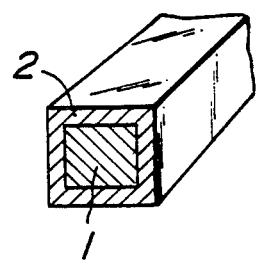
Figure 4:
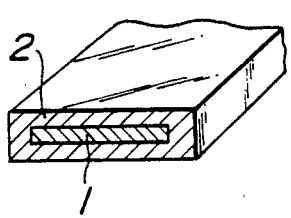
Figure 5:
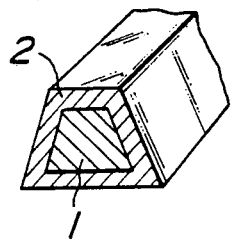
Figure 8:
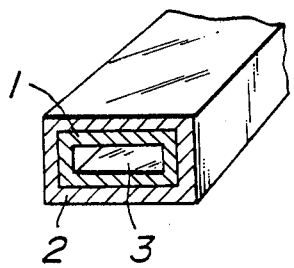
Figure 9:
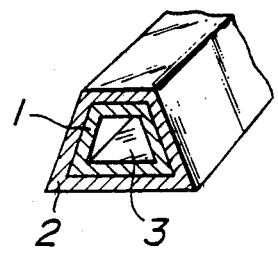
Figure 10:
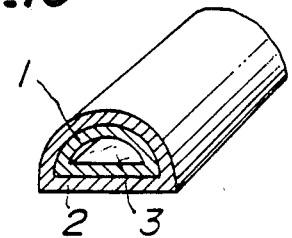

In this case, the water-stopping effect of the flat joint can be achieved solely by the aqueously-swelling water-stopping composition of the water stopper of FIGS. 2, 8, or 15, which water stopper is inserted at the flat joint of the adjacent concrete boards 7. Thus, although the adhesive layers 4 contribute to the improvement of the workability of the water stoppers, the adhesive layers 4 can be dispensed with in principle as far as the water-stopping effect is concerned. Nevertheless, the provision of the adhesive layers 4 apparently improves the bondage of the water stoppers with the concrete body surfaces.

Figure 22:
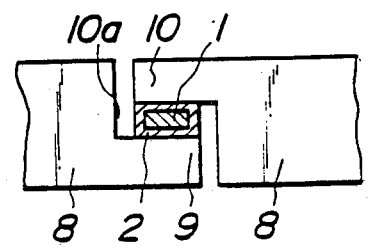

FIG. 22 shows a process of stopping water at joints of Hume pipes. A water stopper of the aqueously-swelling water-stopping composition of the present invention is inserted in a space 10a between an inner annular edge portion 9 and outer annular edge portion 10 of adjacent Hume pipes 8, 8 being joined. The water stopper of this embodiment can be either one of the water stoppers of FIGS. 1 through 6 having the solid core members 1 enclosed by the aqueously-swelling water-stopping composition layers 2 and the water stoppers of FIGS. 7 through 10 having the hollow core members 1 enclosed by the aqueously-swelling water-stopping composition layers 2.

If the water stoppers having an adhesive layer 4 secured to one outside surface of the aqueously-swelling water-stopping composition layer 2 as shown in any of FIGS. 15, 16, 17, and 18 is used, and if such water stopper is secured to the outer surface of the inner annular edge portion 9 of one Hume pipe 8 by using the adhesive layer 4, the joining work of the Hume pipes can be smoothly carried out, because the inner surface of the outer annular edge portion 10 of the other Hume pipe 8 slidably touches the water stopper at a portion where no adhesive layer is provided. Thus, the provision of the adhesive layer 4 at only one side of the water stopper is advantageous in the case of the pipe joint of FIG. 22 or the like.

Figure 23:
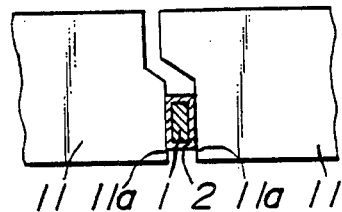

FIG. 23 shows the use of a water stopper at a joint between edge surfaces 11a, 11a of adjacent box culvert segments 11, 11. In this case, the water stopper is simply compressed by the two edge surfaces being joined, and the water stopper is free from twisting or shearing of FIG. 22. Accordingly, it is preferable to have adhesive layers 4 at opposite surfaces of the water stopper as shown in FIG. 19. Although any one of the water stoppers shown in FIGS. 1 through 20 can be used in the case of the joint of box culvert segments, the water stopper of FIG. 19 having the adhesive layers 4 provided at opposite surfaces thereof is preferable, because such adhesive layers 4 improve the workability at the construction site.

Figure 24:
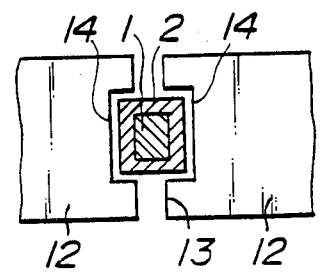

FIG. 24 shows the use of a water stopper at a joint between abutting edge surfaces 13, 13 of adjacent air-entrained concrete (ALC) boards 12, 12. In this case, grooves 14 are formed on the opposing edge surfaces 13, to receive the water stopper. Although any one of the water stoppers shown in FIGS. 1 through 20 can be used in the abutting joint between the air-entrained concrete boards 12, the water stopper with the hollow core member 1 and one or two adhesive layers 4 is preferable for use in the case of FIG. 24, especially for facilitating absorption of pressure.

Figure 25:
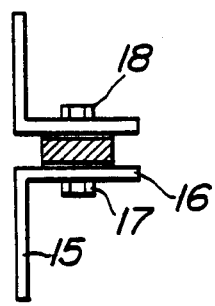

FIG. 25 shows the manner in which water is stopped at the junction of flanges 16 of a water tank or a metal vessel 15 by inserting a water stopper therebetween. In this case, any of the water stoppers shown in FIGS. 2, 3, 4, 8, 15, 17, and 20 can be inserted between the two flanges 16, 16, and the two flanges are tightened together by bolts 17 and nuts 18. The junction of the two flanges 16, 16 is watertightly closed by the aqueously-swelling water-stopping composition of the invention upon tightening by the bolts 17 and nuts 18. The water stopper for this purpose may have one or two adhesive layers on one or two side surfaces thereof.

Figure 26:
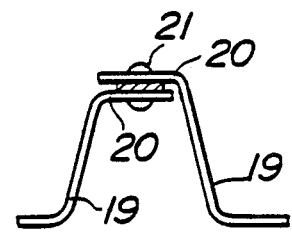

FIG. 26 shows the joint of flanges 20, 20 of folded roof plates 19, 19 by placing a water stopper of the invention between such flanges and inserting a rivet 21 therethrough, which rivet 21 is then caulked to fasten the two folded plates 19, 19 together. The water stopper for this purpose can be similar to that of FIG. 25.

Figure 27:
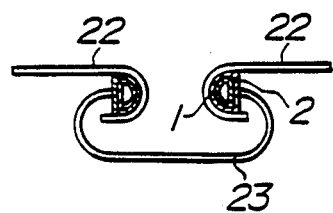

FIG. 27 shows the manner in which a splice plate 23 is watertightly placed between adjacent sheet piles 22 by inserting a water stopper of the invention at each junction of the splice plate 23 with the sheet pile 22. For the junction of FIG. 27, the water stopper having a semi-circular cross section as shown in FIGS. 10, 13, 14, and 16 is preferable. The water stoppers with circular cross sections may be used in this case.

Figure 6:
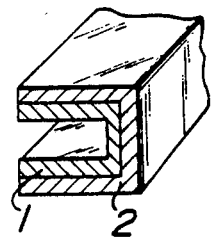
Figure 7:
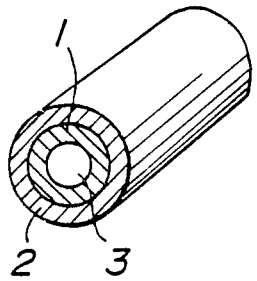
FIGS. 7 through 10 are schematic perspective views of water stoppers of the invention, which are made by enclosing hollow core members with an aqueously-swelling water-stopping composition.
Figure 28:
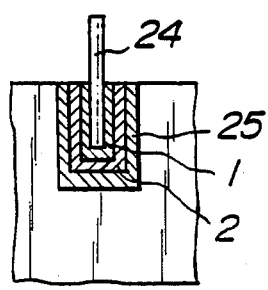

FIG. 28 shows insertion of a water stopper of the invention into the joint between a grooved sash frame 25 and a plate 24 to be held thereby. In this case, the water stopper having a U-shaped cross section as shown in FIGS. 6 and 19 is preferable.

Figure 29:
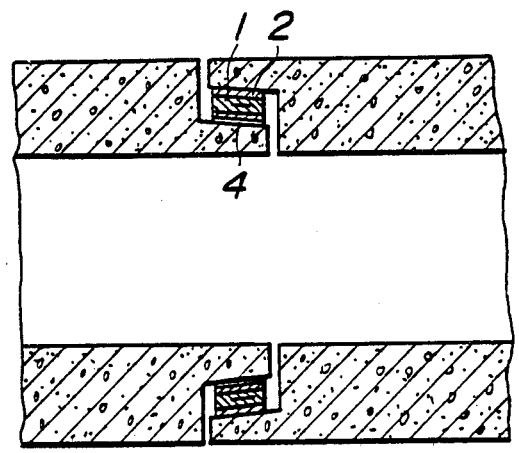
Figure 30:
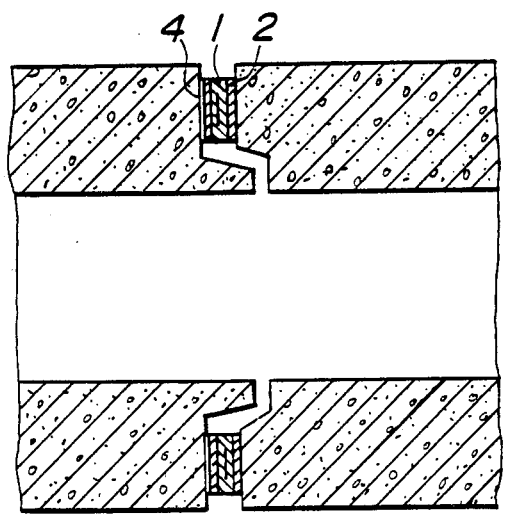

FIGS. 29 and 30 show joint portions between adjacent Hume pipes and between adjacent box culvert segments, wherein the hollow water stoppers with adhesive layers as shown in FIG. 20 are used.

In the water stopper FIG. 20, the hollow core member 1 is made of foam rubber or the like foamed material, so that the hollow core member 1 can absorb most of the dimensional differences at the joint portions and most of the undulations on the concrete surfaces, by the compression and expansion of the core member 1. Minor gaps between the water stopper surfaces and concrete surfaces can be filled by the swelling of the aqueously-swelling water-stopping composition of the water stopper of the invention when the water stopper absorbs water from the outside thereof. Thus, the water stopper of this case has dual water-stopping functions. Furthermore, when the adhesive layer 4 is provided on the water stopper, the water stopper can be secured tightly to the joint portion without applying any primer or separate adhesive thereto, whereby the time necessary to make the joint can be considerably shortened as compared with that of the prior art.

The continuous hollow core member 1 of foam rubber, which is disposed at the central portion of the water stopper, can be made by mixing a foaming agent and a vulcanizing agent in a regular rubber composition, extruding the mixture thus prepared, and passing the extruded body through a suitable heating chamber. The material of the foamed hollow core member can be a suitable synthetic resin, such as polyethylene.

The aqueously-swelling water-stopping layer 2 in the water stopper of the invention can be formed by using either of the following two compositions.

I. A composition consisting of
    10 to 40 weight % of rubber whose main ingredient is reclaimed rubber,
    10 to 20 weight % of silicic compound,
    10 to 60 weight % of bentonite, and
    10 to 40 weight % of plasticizer.

II. A composition consisting of
    10 to 40 weight % of non-cross-linked virgin rubber, of partly-cross-linked rubber or a mixture thereof,
    10 to 20 weight % of silicic compound,
    10 to 60 weight % of bentonite, and
    10 to 40 weight % of plasticizer.

The degree of swelling of the aqueously-swelling water-stopping composition can be adjusted in a range of 50 to 100% by suitably selecting the ingredients thereof.

The layer of the composition of the invention can be integrally overlaid on the aforesaid core member of foamed or non-foamed material by extruding the composition through a T-shaped head of an extruder while feeding the core member simultaneously. The adhesive layer can be formed by using any of natural rubber adhesive, synthetic rubber adhesive, and acrylic resin adhesive.

To use the water stopper, the parting paper is peeled off and the water stopper is attached to a surface to be joined, and another surface to be joined is brought into and held in contact with the opposite surface of the water stopper by a suitable holding means (not shown). When the hollow core member 1 is made of foam rubber or the like, the aqueously-swelling water-stopping composition of the layer 2 fills up most of the portions being joined, so that the aforesaid attaching of the water stopper alone can stop water at the joint.

When water is filled on one side of the water stopper, even if water leaks in the beginning due to some difficulty, the aqueously-swelling water-stopping composition swells as time elapses, and the water leakage is completely stopped in a few hours.

As described in the foregoing, the water stopper of the invention as shown in FIG. 20 comprises the hollow core member 1 made of foam rubber or the like, two aqueously-swelling water-stopping composition layers 2 secured to opposite surfaces of the hollow core member, and the adhesive layer 4 provided on one side surface of the layer 2, so that the water stopper of FIG. 20 is particularly suitable for stopping water at joints of concrete structural members or the like. More particularly, the water stopper of FIG. 20 can be easily applied to structural members, and the material of the resilient core member 1 thereof, such as foam rubber, facilitates filling of large part of gaps in the joint portion of the structural members by the compressive force thereof, and when water reaches the water stopper of the invention, the aqueously-swelling water-stopping composition layer 2 absorbs water and swells, so as to stop water more effectively and prevent water leakage. Thus, the invention contributes greatly to the formation of water-tight joint.

Although the invention has been described with a certain degree of particularity, it is understood that the present disclosure has been made only by way of example and that numerous changes in details of ingredients and construction and the combination and arrangement of parts may be resorted to without departing from the scope of the invention as hereinafter claimed.

What is claimed is:

1. A process of stopping water at a gap in a building structure, comprising the steps of forming a water stopper by securing at least one layer of an aqueously-swelling water-stopping composition on an outer peripheral surface of an elongated core member with high tensile strength; and placing the water stopper in the gap of the building structure, whereby the water stopper swells by absorbing water from the outside thereof so as to fill up that portion of the gap where said water stopper is placed, wherein said aqueously-swelling water-stopping composition consists of 10 to 40 weight % of rubber whose main ingredient is reclaimed rubber blended with less than 30 weight % of virgin rubber, 10 to 20 weight % of a silicic compound selected from the group consisting of silicic acid anhydride, hydrous silicic acid and calcium silicate, 10 to 60 weight % of bentonite, and 10 to 40 weight % of plasticizer.

2. A process as set forth in claim 1, wherein said water stopper is made by enclosing said elongated core member within a plurality of soft rubber layers including at least one layer of said aqueously-swelling water-stopping composition.

3. A process as set forth in claim 1, wherein said water stopper is formed by enclosing an elongated core member having a high tensile strength within at least one layer of said aqueously-swelling water-stopping composition and an outermost layer having at least a part thereof made of water-passing resilient substance.

4. A process as set forth in claim 1, wherein said water stopped is formed by enclosing said elongated core member within said layer of the aqueously-swelling water-stopping composition and providing at least one adhesive layer on outside surface of said layer of the aqueously-swelling water-stopping composition.

* * * * *